3,278,370
SURFACE ACTIVE BACTERIOSTATIC AGENTS

Charles E. McCoy, Jr., and Alfred F. Steinhauer, Midland, Mich., assignors to The Dow Chemical Company, Midland, Mich., a corporation of Delaware
No Drawing. Filed July 16, 1962, Ser. No. 210,186
4 Claims. (Cl. 167—30)

This invention relates to the use of certain higher alkylbenzoates which display advantageous antimicrobial and surfactant properties. More specifically, the invention concerns the utilization of surface active bacterial and fungal growth inhibitors having the formula

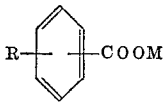

where R is an alkyl radical having from 12 to 18 carbon atoms and M is selected from the group consisting of alkali and alkaline earth metal cations, and ammonium and alkyl- and alkanol-ammonium radicals.

In recent years an increasing number of additives have been employed in various cleansing, protective coating and other product formulations to provide inhibition of microbial surface growths. These additives have frequently created formulation problems and often possess an undesirable toxicity. For example, the bacteriostatic agents presently utilized as additives in soaps and synthetic detergents are generally non-surface active and have limited solubility in aqueous solutions. Also, the various germicides which are incorporated in latex paint formulations to inhibit mold growths usually impart an undesirable toxicity to the paint.

It has now been discovered that certain higher alkylbenzoates, i.e. benzoates having an alkyl group containing from 12 to 18 carbon atoms, are effective as surface-active bacteriostatic agents and may be advantageously incorporated in cleansing compositions to provide effective antimicrobial activity. It has also been discovered that these benzoates are effective in providing long lasting fungal growth inhibition when employed as additives in various protective coating formulations, such as latex paints, and in formulation of synthetic products, such as plastic shower curtains, which are utilized under environmental conditions favorable to microbial growth.

The following procedure, Example 1, illustrates one method for preparing compounds employed as surface active antimicrobial agents in accordance with this invention.

EXAMPLE 1

A quantity of 160 grams (1.0 mole) of bromine was added dropwise over a period of 30 minutes to a reaction vessel, maintained at 60° C., containing 246 grams (1.0 mole) of dodecylbenzene and 1 gram of ferric chloride. The brominated material was first washed with a 30 percent by weight aqueous solution of sodium hydroxide and then washed with water. Approximately 200 grams of material was recovered by distillation at a temperature of from 131° to 148° C. and a pressure of about 0.3 mm. Infrared analysis identified this product as p-dodecylbromobenzene.

A quantity of the above product was reacted, at 69° to 70° C., with 5 grams of magnesium turnings in tetrahydrofuran. The Grignard product, hydrolyzed by pouring the solution onto solid carbon dioxide, yielded 30 grams of dodecyl benzoic acid which was recovered by distillation at a temperature of about 168° to 175° C. and under a reduced pressure of about 1.05 mm., absolute. Neutralization of the acid with sodium hydroxide resulted in the sodium salt of dodecylbenzoic acid.

In the example above, the highly branched dodecyl group of the starting material influenced bromination of the para-position, however, straight chain dodecyl groups, which yield larger percentages of the ortho- and meta-isomers, may also be employed.

Another method for preparing highly branched alkylbenzoates suitable for use in accordance with this invention is described in U.S. Patent 2,578,654.

The product of Example 1 was employed as an additive in synthetic detergents and also in bars of soap with no difficulty in formulation. In the following examples the surface activity and bacteriostatic properties of this dodecylbenzoate are described. It should be noted that these are the properties of individual batches and the figures will vary somewhat with each preparation.

EXAMPLE 2

The surface active properties of an aqueous solution of sodium dodecylbenzoate, prepared in the manner of Example 1, containing 0.1 weight percent of the salt were measured with the following results:

Surface tension _____ 28.4 dynes/cm.$^2$
Foam height _____ 0 min.—184 mm., 5 min.—177 mm.
Foam stability _____ 96 percent.
Interfacial tension _____ 4.4 dynes/cm.$^2$
Wetting time _____ 5 sec.

EXAMPLE 3

The bacteriostatic properties of sodium dodecylbenzoate were tested by utilizing a 1 to 1000 dilution (wt./vol.) of sodium dodecylbenzoate in sterile distilled water. This stock solution was used to provide from 2 to 8 p.p.m. of sodium dodecylbenzoate in test tubes containing A.O.A.C. broth. A 4 mm. loop-full of a 24 hour broth culture was added to each tube and the tubes were then incubated for 48 hours and read for growth. *Staphylococcus aureus* (strain No. 209) was used as the bacterial organism. No growth was discernible at concentrations of 4 p.p.m. and higher of sodium dodecylbenzoate. A phenol coefficient of 4 was determined by employing the Official A.O.A.C. Phenol Coefficient method.

The soluble salts of these higher alkylbenzoic acids are advantageously employed in the formulation of commercial detergent products, such as laundry or dishwashing detergents, to provide improved properties in both soft and hard water. These benzoates are useful either as the sole active detergent or in combination with one or more anionic or nonionic detergents, and compare favorably with commercial detergents in washing and cleaning properties. In addition the benzoates can be combined with the known builders, extenders, antiredeposition agents, brighteners, foam modifiers, and the like, each of which then performs its normal function. An important advantage obtained by employing these higher alkylbenzoates results from the ability of detergent builders, such as the polyphosphates, to preferentially tie up the calcium and magnesium ions present in hard water, thus effectively preventing precipitation of insoluble benzoates. This phenomenon is in direct contrast to the general ineffectiveness of polyphosphates to prevent calcium and magnesium salt precipitation when most commercial soaps are used in hard water. The following example illustrates this comparison.

EXAMPLE 4

A series of active agents, listed in the following table, were tested for precipitation in hard water by adding successive 2 ml. aliquots of a 1 percent aqueous solution of the active agent to flasks containing 100 ml. of a solution prepared by mixing 800 ml. of water (having a hardness of 150 p.p.m.) and 0.8 gram of sodium tripolyphosphate. Visual observations of these solutions are tabulated below in Table I.

*Table I*

|  | 2 ml. | 4 ml. | 6 ml. | 8 ml. |
|---|---|---|---|---|
| Ivory Soap | Flocs | Flocs | Flocs | Pearly. |
| Coco tallow soap | Cloudy | Cloudy | Cloudy | Cloudy. |
| Potassium coconut soap | Cloudy | Cloudy | Cloudy | Pearly. |
| Sodium tall oil | Clear | Hazy | Cloudy | Cloudy. |
| Potassium oleate | Cloudy | Cloudy | Cloudy | Cloudy. |
| Sodium dodecylbenzoate | Clear | Clear | Clear | Clear. |

The susceptibility of latex paints to mold growths which shorten the life of the paint may also be advantageously combatted by the use of the surface active antimicrobial agents of this invention. Since latex inherently contains from about 2 to 4 percent of a surfactant, the utilization of a surfactant possessing antimicrobial properties enables the elimination or marked reduction of the use of toxic germicidal components in the latex paint formulations. The following example demonstrates the efficacy of sodium dodecylbenzoate as a surface-active antimicrobial component in such formulations.

EXAMPLE 5

Sodium dodecylbenzoate was stirred into 2 samples of an experimental styrene-butadiene latex containing no other additives. The first sample contained 2½ weight percent and the second sample 5 weight percent of sodium dodecylbonzoate. These latex formulations were used to paint wooden panels 4 inches square, which were then tested in a tropical chamber. This test consisted of hanging the samples on racks in the tropical test chamber. The period of exposure was eight weeks at a temperature of 85° F. and a relative humidity of 85 to 100 percent. The concentration of airborne fungus was great enough to cause growth on any unprotected nutrient material. The results were as follows.

Concentration: Results
2½ percent _____ No growth on sample.
5 percent _____ No growth on sample.
Control sample __ Medium growth over entire sample.

The higher alkylbenzoates are additionally useful as additives in the formulation of synthetic products which are used under environmental conditions favorable to microbial growth. The following experiment, Example 6, demonstrates the effect of inclusion of minor amounts of sodium dodecylbenzoate in a shower curtain composition.

EXAMPLE 6

A polyvinyl chloride resin was prepared by dry-blending in a household-type mixer 60 g. of polyvinyl chloride with 30 g. of dioctyl phthalate plasticizer, 2 g. of epoxidized soya bean oil, 1 g. of a heat and light stabilizer and from 1 to 5 weight percent based on the total mixture, of sodium dodecylbenzoate. The resulting mixture was placed on a two-roll mill for 15 min. at a temperature of 160° to 170° C. and a portion of the milled product was then flash molded into a square sheet which was hung in the tropical test chamber described in Example 5. After 14 months a control sheet, similarly prepared but containing no sodium dodecylbenzoate, was uniformly covered with a heavy mold growth while sheets containing from 2.5 to 5 percent by weight of sodium dodecylbenzoate showed practically no mold growth. A sheet containing one weight percent sodium dodecylbenozate had only a slight amount of surface mold growth.

We claim:
1. A method for imparting antimicrobial properties to the surface of an article which comprises incorporating in the surface layer of said article an antimicrobially effective amount of a compound corresponding to the formula

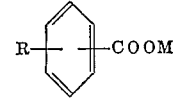

wherein R is an alkyl radical containing from 12 to 18 carbon atoms and M is selected from the group consisting of alkali and alkaline earth metal cations and ammonium and alkyl- and alkanol-ammonium radicals.

2. The method of claim 1 wherein said article is formed from a polymer of vinyl chloride.

3. A method for imparting antimicrobial properties to a surface comprising applying to said surface, in combination with a latex paint, an antimicrobially effective amount of a compound corresponding to the formula

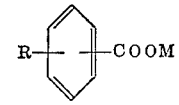

wherein R is an alkyl radical containing from 12 to 18 carbon atoms and M is selected from the group consisting of alkali and alkaline earth metal cations and ammonium and alkyl- and alkanol-ammonuim radicals.

4. The method of claim 3 wherein the latex paint is a styrene-butadiene latex paint.

References Cited by the Examiner
UNITED STATES PATENTS

| | | | |
|---|---|---|---|
| 2,195,198 | 3/1940 | Balle et al. | 260—515 |
| 2,295,505 | 9/1942 | Shelton | 167—22 |
| 2,541,248 | 2/1951 | Hibbs | 167—22 |
| 2,578,654 | 12/1951 | Hearne et al. | 260—515 XR |
| 2,742,434 | 4/1956 | Kopp | 252—106 |
| 2,789,022 | 7/1957 | Yowell et al. | 252—106 XR |
| 2,965,575 | 12/1960 | Beaver et al. | 252—106 |
| 3,004,943 | 10/1961 | Brown et al. | 260—29.7 |
| 3,095,397 | 6/1963 | Musch | 260—29.7 |
| 3,096,183 | 7/1963 | Genth | 252—106 XR |
| 3,136,755 | 6/1964 | Grosser et al. | 252—106 XR |

LEON D. ROSDOL, *Primary Examiner.*
JULIUS GREENWALD, *Examiner.*
W. E. SCHULZ, *Assistant Examiner.*